June 9, 1925.  1,541,576

A. JOHNSON

CIRCULATING AND RADIATING HEATER

Filed July 1, 1924

Inventor.
Axel Johnson
By Harry A. Totten
Attorney.

Patented June 9, 1925.

1,541,576

UNITED STATES PATENT OFFICE.

AXEL JOHNSON, OF OAKLAND, CALIFORNIA.

CIRCULATING AND RADIATING HEATER.

Application filed July 1, 1924. Serial No. 723,508.

*To all whom it may concern:*

Be it known that I, AXEL JOHNSON, a citizen of the United States, residing at Oakland, in the county of Alameda and State of California, have invented certain new and useful Improvements in Circulating and Radiating Heaters, of which the following is a specification.

The present invention relates to room heaters of the type employing both radiation and air convection.

The principal object of the invention is to provide a heater of simple and inexpensive construction which will be efficient in operation. A secondary object is to provide a heater adapted for the economical use of electricity in the heating member. A still further object is to provide such a heater in sectional form, so that heaters of various sizes and capacities may be quickly assembled from standardized units or sections of a comparatively small number of forms. These and other objects of the invention will become apparent from the following specification and the accompanying drawings, in which is described and illustrated, as a typical example, a heater embodying the invention, and provided with an electric heating member. It is to be understood, however, that other forms of heating members may be used, and that the construction and form of the device may be varied from that herein shown and described, without departing from the essential principles of the invention as expressed in the claims hereto appended.

With this in view a typical heater embodying my present invention will now be fully described with reference to the accompanying drawings, wherein—

Figure 1:
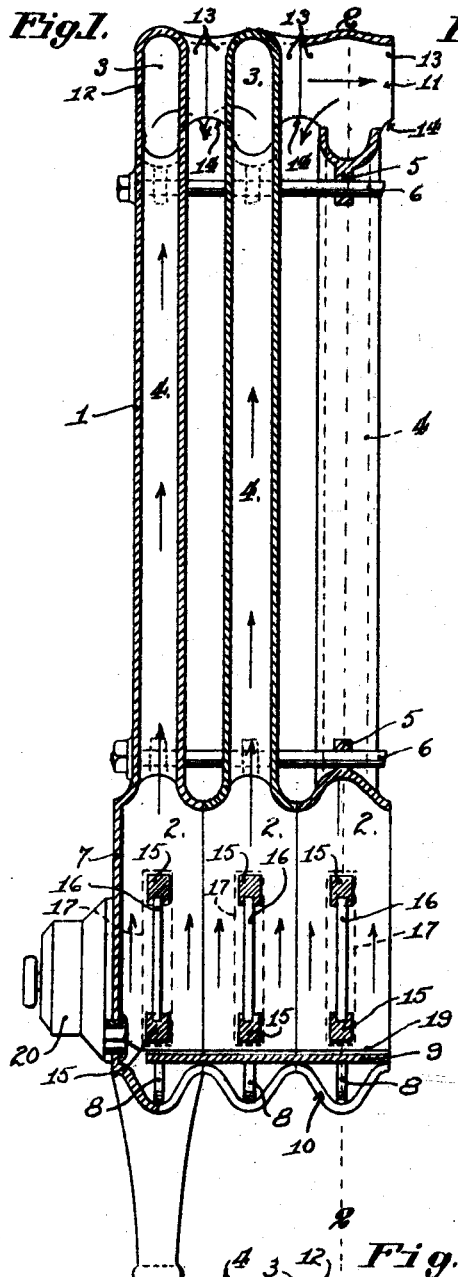
Fig. 1 is a vertical longitudinal section of one end portion of the heater, taken partly on the line 1—1 and partly on the line 1'—1' of Fig. 2.
Figure 2:
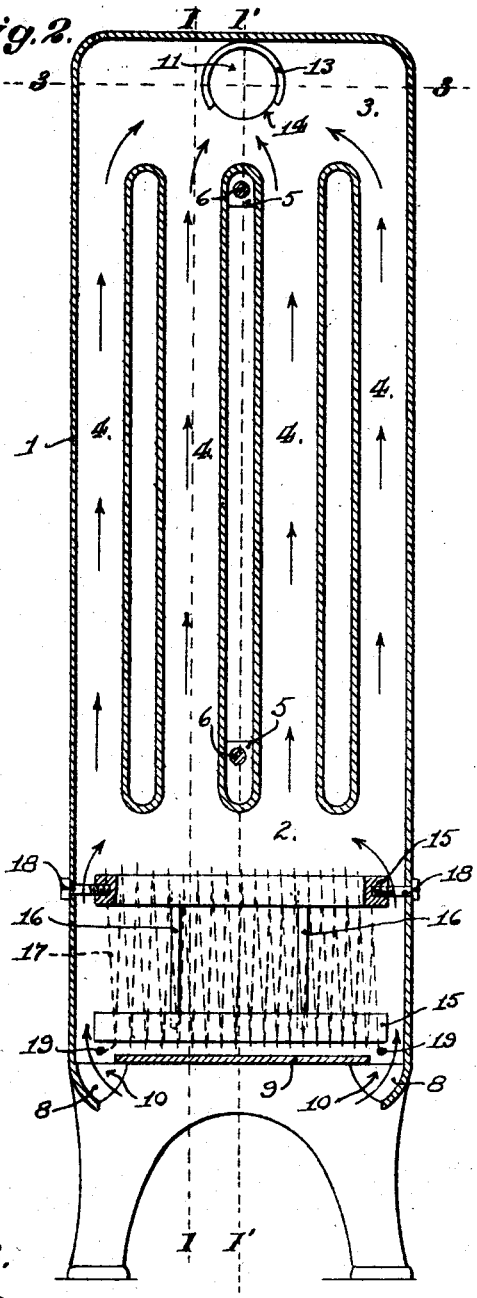
Fig. 2 is a transverse vertical section taken on the line 2—2 of Fig. 1.
Figure 3:
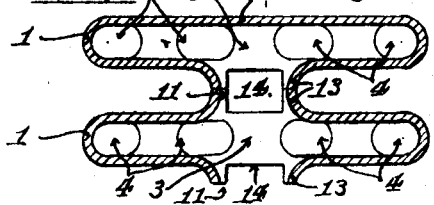
Fig. 3 is a horizontal section taken on the line 3—3 of Fig. 2.

The heater shown in the drawings comprises a plurality of adjacent sections 1, which are formed with lower heating chambers 2, upper circulating chambers 3, and flues 4 connecting said lower and upper chambers. Apertured lugs 5 are provided, through which extend longitudinal rods or bolts 6 for holding the entire series of sections together. The lower or heating chambers 2 are open at their ends, thus communicating with each other and forming a continuous chamber extending the entire length of the heater. The endmost sections, however, are closed as shown at 7, forming ends for said continuous chamber. The chambers 2 are open at the bottom to admit air, and are provided with brackets 8 adapted to support a deflector plate 9 extending the entire length of the heater. Said plate 9, which is spaced from the sides of the chambers 2, as shown at 10, protects the floor beneath the heater from direct radiation from the heating members. The upper chambers 3 are also provided with intercommunicating flanged apertures 11, the end sections being closed as shown at 12. Said apertures may be of any suitable size and form, and the flanges 13 thereof are cut away at their lower portions, as shown at 14, to provide for the discharge of the air from within the heater. Said outlets 14 are preferably so proportioned that their total aggregate area is somewhat less than that of the air inlet opening 10, so that the circulation of air is restricted at its outlet from the heater, rather than at its inlet.

The continuous chamber formed by the series of connecting chambers 2 is adapted for the reception of one or more heating members, which may be of any suitable form and type. In the drawings, I have shown a preferred form of electric heating member, there being one such heating member positioned within the chamber 2 of each section. Each of said heating members, all of which are alike, comprises spaced horizontal bars 15 of suitable refractory insulating material, connected by spacing rods 16, and a coil of suitable resistance wire, indicated by the broken line 17. The heating member thus formed is supported transversely within the chamber 2 in any desired manner, as for example by screws 18 extending from the ends of the upper bar 15. The coils 17 of the heating members may be connected in any desired manner in a circuit or combination of circuits, but for purposes of illustration I have shown said heating coils as connected with a pair of conductors 19 extending lengthwise through the heater from a switch indicated at 20. It is understood that suitable conductors, not shown, are provided for connecting said switch and the conductors 19 with an outside source of power.

When the heater is in operation, air currents are set up by the expansion of the heated air, the cold air entering through the bottom openings 10, passing over and around the heating members and being heated thereby, then rising through the flues 4, and escaping through the upper openings 14. The heater therefore operates both by convection or circulation of air, and by radiation from its exterior, the walls of the sections 1 being heated partly by the passage of the heated air therethrough and partly by direct radiation from the heating members.

On account of the positioning of the air outlet opening 14 in the lower portions of the connecting flanges 13, dust and foreign matter are excluded from the interior of the heater, and the air is forced to follow a somewhat tortuous path, thereby more effectively heating the upper portions of the sections 1, and causing more radiation therefrom. This effect is still further increased by the restriction of the circulation at the outlets 14, rather than at the inlets 10.

It will be readily seen that the sectional construction of my heater enables the assembling of heaters of any desired size or capacity from but two forms of sections, viz: the inside form and the end form.

I claim:—

1. A circulating and radiating heater comprising a plurality of assembled sections, each section having a lower chamber, an upper chamber, and a connecting flue therebetween, said lower chambers of the assembly communicating with each other and having air inlet openings in their lower portions, and said upper chambers communicating with each other and having air outlet openings; and a heating member positioned within each of said lower chambers.

2. A circulating and radiating heater comprising a plurality of sections, each section having a lower chamber, an upper chamber, and a connecting flue therebetween, said lower chambers having air inlet openings in their lower portions and communicating with each other to form a continuous chamber extending the entire length of the heater, and said upper chambers communicating with each other to form a continuous chamber extending the entire length of the heater and having air outlet openings; and a heating member positioned within said lower continuous chamber.

3. A circulating and radiating heater comprising a plurality of sections, each section having a lower chamber, an upper chamber, and a connecting flue therebetween, said lower chambers having air inlet openings in their lower portions and communicating with each other to form a continuous chamber extending the entire length of the heater, and said upper chambers having downwardly directed air outlet openings; and a heating member positioned within said lower continuous chamber.

4. A circulating and radiating heater comprising a plurality of sections, each section having a lower chamber, an upper chamber, and a connecting flue therebetween, said lower chambers having air inlet openings in their lower portions and communicating with each other to form a continuous chamber extending the entire length of the heater, and said upper chambers having air outlet openings, the aggregate area of said outlet openings being less than the aggregate area of said inlet openings; and a heating member positioned within said lower continuous chamber.

5. A circulating and radiating heater comprising a plurality of sections, each section having a lower chamber provided with an air inlet opening, an upper chamber provided with an air outlet opening, and a flue connecting said chambers; and a heating member positioned in the lower chamber of each section.

6. A circulating and radiating heater comprising a shell having a lower chamber provided with an air inlet opening, an upper chamber provided with an air outlet opening of less area than said inlet opening, and a flue connecting said chambers; and a heating member positioned within said lower chamber.

7. A circulating and radiating heater comprising a shell having a lower chamber provided with an air inlet opening, an upper chamber provided with a downwardly directed air outlet opening, and a flue connecting said chambers; and an electric heating member positioned within said lower chamber.

8. A circulating and radiating heater comprising a plurality of sections, each section having a lower chamber provided with an air inlet opening, an upper chamber provided with air outlet opening, and a flue connecting said chambers; means for detachably securing the sections in parallel relation, and an electric heating member positioned within the lower chamber of each section.

9. A circulating and radiating heater comprising a plurality of sections, each section having a lower chamber provided with an air inlet opening, an upper chamber provided with an air outlet opening, and a flue connecting said chambers, the upper chambers of adjacent sections communicating with each other through flanged apertures; and a heating member positioned within the lower chamber of each section.

10. A circulating and radiating heater comprising a plurality of sections, each section having a lower chamber provided with an air inlet opening, an upper chamber, and a flue connecting said chambers, the upper chambers of adjacent sections communicating with each other through flanged apertures, and the flanges of said apertures being cut away at their lower portions to provide air outlet openings; and a heating member positioned within the lower chamber of each section.

In testimony whereof I have signed my name to this specification.

AXEL JOHNSON.